United States Patent [15] 3,665,164

Beveridge et al. [45] May 23, 1972

[54] APPARATUS FOR READING OPTICALLY CARDLIKE ELEMENTS AND A MERCHANDISING SYSTEM UTILIZING THE SAME

[72] Inventors: Robert W. Beveridge, Costa Mesa; Felix Macaluso, Fountain Valley, both of Calif.;

[73] Assignee: Ricca Data Systems, Inc., Santa Ana, Calif.

[22] Filed: July 9, 1970

[21] Appl. No.: 53,473

[52] U.S. Cl...................235/61.11 E, 235/61.7 B, 340/149 A

[51] Int. Cl...........................................................G06k 7/10

[58] Field of Search......................235/61.11 E, 61.7 B, 61.9; 340/149 A; 250/227, 219 I; 179/6.3 CC

[56] References Cited

UNITED STATES PATENTS

| | | | |
|---|---|---|---|
| 3,555,247 | 1/1971 | Gruczelak | 235/61.11 E |
| 3,213,179 | 10/1965 | Clauson | 235/61.11 E |
| 3,534,397 | 10/1970 | McWade | 235/61.11 C |
| 2,980,319 | 4/1961 | Clemens et al. | 235/61.11 C |
| 3,018,947 | 1/1962 | Harruff et al. | 235/61.11 C |
| 3,238,501 | 3/1966 | Mak et al. | 235/61.11 E |
| 3,427,440 | 2/1969 | Ruscher | 235/61.9 |

*Primary Examiner*—Thomas A. Robinson
*Attorney*—Smyth, Roston & Pavitt

[57] ABSTRACT

Apparatus for optically reading flat elements such as merchandise tickets and credit cards in which holes have been punched to encode information. When the element is properly indexed, the reading is accomplished by directing light against the element disposed against an opaque panel in which are embedded ends of light conductive fibers in a pattern such as to provide a fiber end in registry with every possible hole position in the element. The fibers extend to another opaque panel where their other ends are disposed in registry with a bank of phototransistors. Electronic means are connected to decode the current impulses produced by phototransistors as they receive light from the second fiber ends. The merchandising system employs this apparatus to read in sequence both Kimball type merchandise tickets and special credit cards.

10 Claims, 8 Drawing Figures

Patented May 23, 1972 3,665,164

4 Sheets-Sheet 1

INVENTORS
Robert W. Beveridge
Felix Macaluso
By Smyth, Roston & Pavitt
ATTORNEYS INVENTORS
Robert Beveridge
Felix Macaluso
By Smyth, Roston & Pavitt
ATTORNEYS Patented May 23, 1972 3,665,164

4 Sheets-Sheet 3

INVENTORS
Robert W. Beveridge
Felix Macaluso

By Smyth, Roston & Pavitt
ATTORNEYS

INVENTORS
Robert W. Beveridge
Felix Macaluso
By Smyth, Roston & Pavitt
ATTORNEYS

APPARATUS FOR READING OPTICALLY CARDLIKE ELEMENTS AND A MERCHANDISING SYSTEM UTILIZING THE SAME

BACKGROUND OF THE INVENTION

1. Field of the Invention

This invention relates to computerized data processing systems utilized in retail store operations and also to devices in general which are adapted to read holes punched in flat card-like elements.

2. Description of the Prior Art

Optical reading of holes in cards of the IBM type and in paper tapes has been accomplished for a number of years. However, such reading has been effected by passing the card or tape across a reading head and picking up light emissions through the rows of holes in the card or tape moved sequentially over phototransistors against which a source of light is directed.

Heretofore, such devices have of necessity been stationary because the reading heads have been quite large in size and the associated electronic decoding systems have been of such nature as to require installation in console types of equipment.

In addition, prior art devices have required relatively wide spacing of the holes in the card or tape to avoid light leakage between adjacent phototransistors. This has greatly limited as a practical matter the types of cards or tapes which could be read and the amount of information which could be encoded into smaller cards or tapes. Only within the past two or three years have efforts been made to adapt or design such prior art devices to read the widely used print punched merchandise tickets known in the garment industry as a "Kimball ticket" or "Dennison ticket."

Such print punched tickets were originated some fifteen years ago as a means of encoding certain information onto a removable ticket which is attached to a garment. Both the Kimball and Dennison tickets are approximately 2 by 1 inch in size and ten-thousandths of an inch thick with a non-rectangular peripheral configuration. The manufacturer or other vendor of the merchandise purchases or leases a punching machine from its manufacturer (e.g. Kimball Machine Corp.) and by punching preselected keys can encode into this ticket, by certain patterns of holes which the machine punches into the ticket, information concerning the merchandise, such as its stock number, source of manufacture, delivery date, price, warehouse location, etc. The Kimball ticket can thus encode up to 48 decimal digits with its possible hole patterns. The hole centers may be spaced together as closely as 0.062 inches by 0.087 inch.

Heretofore, until the last two or three years, the information thus encoded in the holes in Kimball and Dennison tickets has been read by mechanical devices which sense the presence of holes by feelers. In these mechanical devices, when a feeler mechanically inserts its tip into a hole, the opposite end of the feeler rod may complete an electrical circuit in an area isolated from any contamination of the ticket. Reading by this means has been slow and often inaccurate. Moreover, the readers are heavy pieces of equipment which must be disposed at a relatively fixed location so that the Kimball and Dennison tickets must be removed from the merchandise and brought to the stationary reader for insertion and reading.

Within the last two or three years the manufacturer of the Kimball tickets has put on the market an optical reader known as the KR1200. This reader moves the ticket like a paper tape across a row of optical sensors which ascertain the hole patterns on the ticket, row by row as the ticket is so moved longitudinally over the row of sensors. This reader, however, is also quite large in size (present models being of substantial console configuration and size) and is incapable of reading instantly the complete hole pattern on the ticket.

Thus, because of the necessarily large size of the Kimball ticket readers, both mechanical and optical, reading of the Kimball and Dennison tickets has heretofore been confined to situations where the tickets have been removed from the merchandise, i.e., after it is sold or the tickets have otherwise been removed from the merchandise so they could be delivered to the store office in which the heavy mechanical reader or console optical reader is located. Since removal of the ticket from the merchandise is thus required for reading by such readers heretofore available, prior to the present invention, it has been impractical for a store to use the Kimball tickets to secure inventory data in the manner possible with the present invention.

While plastic credit cards have been in widespread use in merchandising operations, such cards have not generally been employed in any direct communication with the data processing system of a department store. Thus, when a customer with a credit card makes a purchase, the card is employed to stamp the customer's account identification upon a sales ticket. This ticket is later tabulated and its information fed into the store's data processing system. Where the purchase exceeds a prescribed amount, the sales clerk is required to call in to a credit control station to determine the status of the account and whether the purchase on credit is to be authorized.

It is necessary for the sales clerk or the credit control clerk to check a written list to ascertain whether the credit card privilege has been withdrawn, and, if it has, to retrieve the card from the customer. This procedure is slow and open to the possibility of error.

Recently, efforts have been undertaken by several computer manufacturers to eliminate the necessity of the sales clerk's having to write up a sales ticket by providing terminals in lieu of cash registers at the points of sale in a retail store having a computerized system. Each of these terminals may include a keyboard into which the clerk punches numbers representing certain information concerning the item of merchandise sold, such as its price, stock number, quantity, etc., and even concerning the customer's credit card. However, this is still slow and cumbersome and, because of the human operation, errors may occur. Moreover, such a system has not eliminated the problems of checking the credit of the credit card holder by telephoning the credit control office of the store and watching for bad credit cards.

It may be seen, thus, that there is great room for the improvement in the operation of the retail stores which are utilizing data processing systems to provide an up-to-date accounting information, inventory control and credit information.

SUMMARY OF THE INVENTIONS

The present inventions are directed to improving retail (and particularly, department) store operations in several important aspects.

In the first place, an optical reader is provided which is adapted to read directly the standard Kimball or Dennison merchandising ticket. This reader may be provided at each point-of-sale terminal in the store so that the sales clerk may record a sale directly into the store's date processing system simply by removing the Kimball or Dennison ticket from the item of merchandise being sold and inserting this ticket into the optical reader of the terminal.

Secondly, the reader may be incorporated in a portable unit which comprises a handcarried and triggered optical reading head and an electronic decoding and recording package which may be readily carried by a strap over the inventory clerk's shoulder. This clerk may then move through aisles of merchandise and take complete inventory information which is recorded on a tape by inserting the Kimball or Dennison tickets (while still left on the merchandise) into the portable reading head. When the tape is removed from the portable package and inserted into a tape reader, all data may then be fed into the store's computer system. By this means, the store's inventory may be rapidly and accurately taken, thereby reducing substantially the store's "down time" for inventorying its stock of merchandise and overtime employment of the store clerks.

A third important feature of the optical reader of the present invention which is provided for the store's point-of-sale terminal, is its ability to read not only the holes in a Kimball or Dennison merchandise ticket, but the holes in a new form of credit card; and this incapability leads to the novel system of the present invention whereby the store provides its customers with credit cards with holes instead of numbers and name and address identification embossed in the cards. By having its customers use this holed type of card, the sales clerk may very rapidly complete a sales transaction and thereby have much more time available for selling. Thus, to record a credit card sale, the clerk first inserts the Kimball or Dennison ticket into the terminal reader. This effects an immediate sale record into the store's data processing system and the appropriate sales information is printed out on a sales slip at the point-of-sale terminal. Next the credit card is inserted into the reader whereupon an immediate up-to-date credit check is made against the memory system of the store's computer and that memory system is simultaneously updated to record the credit purchase. If the credit sale is authorized, the computer immediately transmits a release signal to the terminal so that the sales clerk may remove the credit card. If the sale results in a use of credit beyond the account authorization or the card is not otherwise to be honored, it is locked into the terminal until released by a store manager who is directed promptly to appear at the terminal in question. When a sale is authorized, however, the credit card readings and printout of the sales ticket may be accomplished in a matter of seconds. This to be compared with the many minutes that most customers experience in standing around in department stores while the sales clerk first records price and other merchandise information on a sales ticket and then checks the customer's credit before releasing the item for wrapping and delivery to the customer.

BRIEF DESCRIPTION OF THE DRAWINGS

In the accompanying drawings.

DESCRIPTION OF THE PREFERRED EMBODIMENTS

Figure 1:
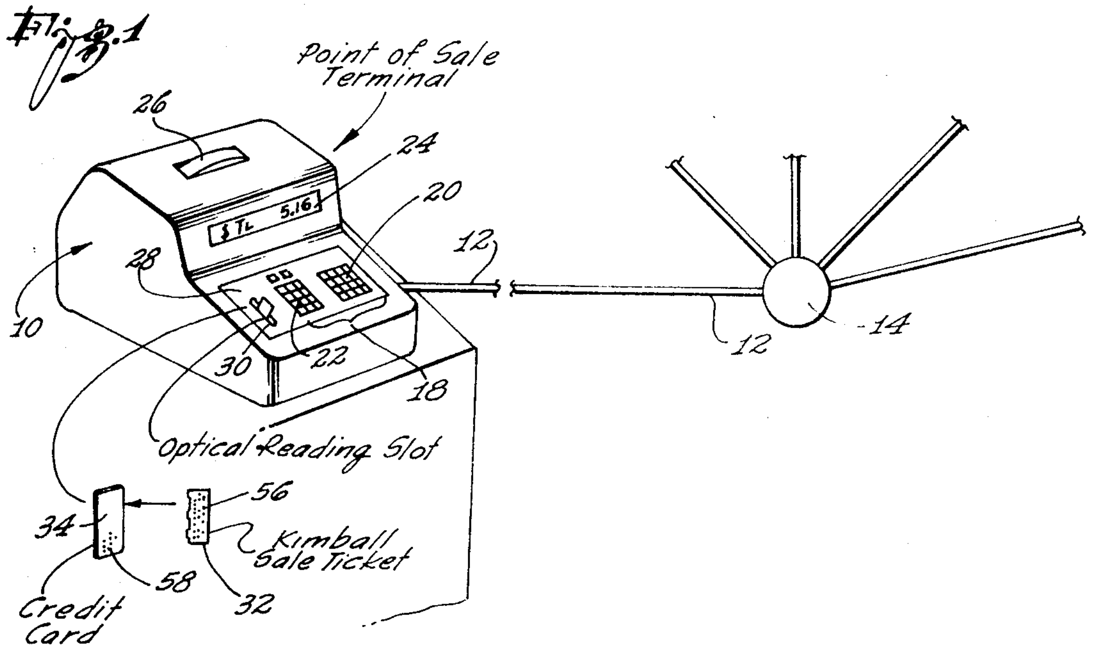
FIG. 1 is a front elevation of a point-of-sale terminal of the present invention showing its attachment schematically to an electronic data processing center.

Referring to FIG. 1, the numeral 10 designates a point-of-sale terminal device which is connected by a pair of wires 12 to a multiplexer 14 (FIG. 2) which, in turn, is connected to the department store's electronic data processing (EDP) center, schematically represented by the block 16. The terminal 10 includes a keyboard 18 with one set of keys 20 numbered from 0 to 9 and a second set of instruction keys 22. By the use of these two sets of keys 20, 22, information and inquiries may be manually directed to the computer system. In addition, the terminal is provided with a display face 24 and a printer 26 on each of which information inserted into the terminal will appear — on the former temporarily; but on the latter permanently on some type of paper tape. On the left front face 28 of the terminal 10 is an optical reading slot 30 into which may be inserted either a Kimball ticket 32 or a credit card 34. The manner in which this reading is accomplished will be described more in detail later in this specification in connection with the description of the electronics of the portable reading head of FIG. 4–7*b*.

Figure 2:
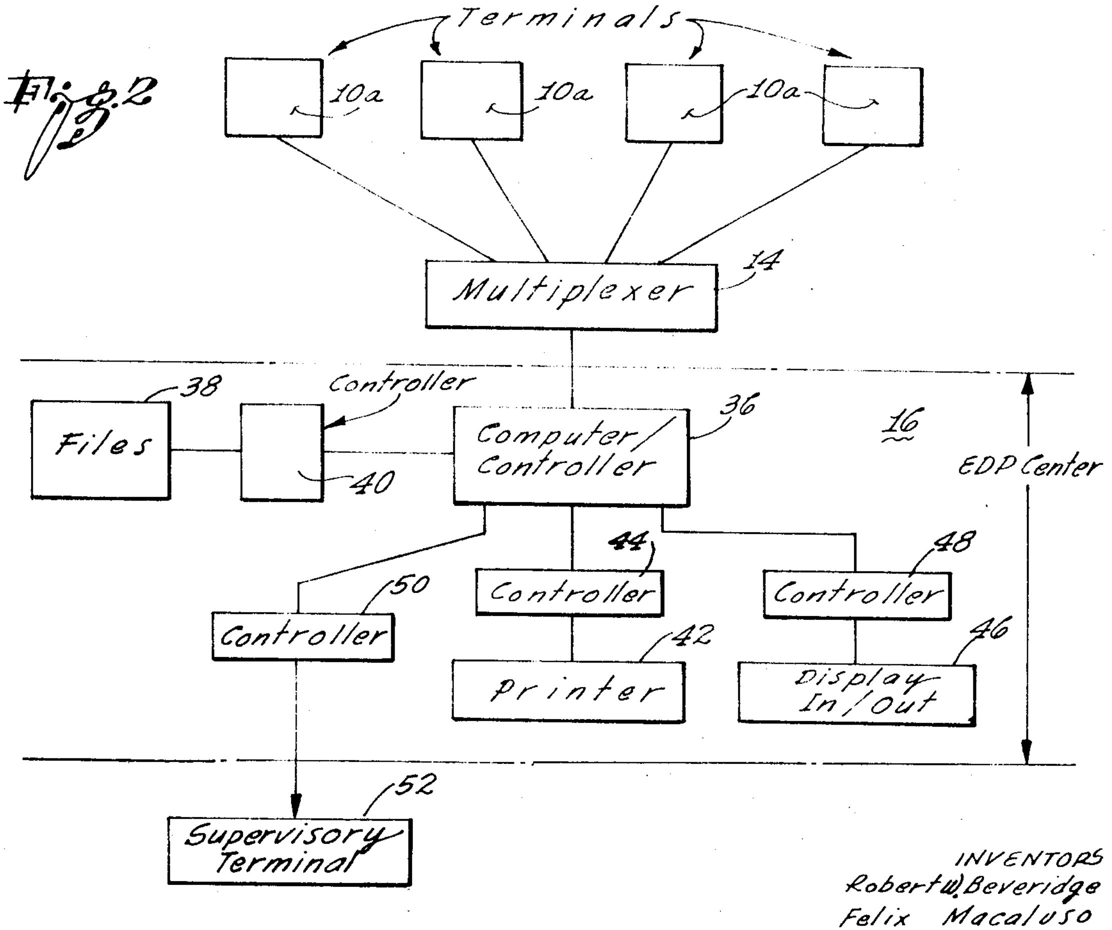
FIG. 2 is a block diagram of the computerized system in which the terminal of the present invention may be employed.

FIG. 2 discloses in block form what will be recognized by persons skilled in the computer and data processing art, as a typical computerized point-of-sale system in which the terminals 10a are serially polled by a multiplexer 14. Through the computer controller 36, its own memory system may be searched as well as that of the disc or other types of files 38 through the controller 40, and appropriate responses made by the computer controller 36 to inquiries from the terminals 10a and updating of the memory files 38 is simultaneously thereby accomplished. A printer 42 connected to the computer controller 36 by its own controller 44 and a display unit 46 similarly connected by its own controller 48 may be disposed in the EDP center 16. A further controller 50 connected to the computer controller 36 may incorporate a supervisory terminal 52 into the system for feeding in information or making inquiries to the system.

The novelty of the present invention lies in its use in the conventional system illustrated schematically in FIG. 2 to permit instantaneous reading of information contained on the Kimball ticket and credit card and its feeding into the system through the optical readers in the terminals **10*a*, and the obtaining of immediate responses from the system memory sources at each point-of-sale terminal 10*a* in the form of visual display, printed tape and release or retention of the purchaser's credit card. To accomplish this, however, it is necessary to provide both merchandise and credit information in the memory sources of the computer controller 36 and its memory files 38**.

The optical reader of the present invention which is incorporated in the terminals **10, 10*a* heretofore referred to has not been thusfar described. The manner in which such a reader is constructed and operates may best be explained in considering the portable optical reading head 54** which is illustrated in the FIG. 4 through 7*b* embodiment of the invention. The head 54 is designed, however, only to read the hole patterns 56 punched into Kimball tickets 32 and not hole patterns 58 in credit cards 34 or to lock the credit card in the slot **30*a*** until released by the computer.

Figure 6:
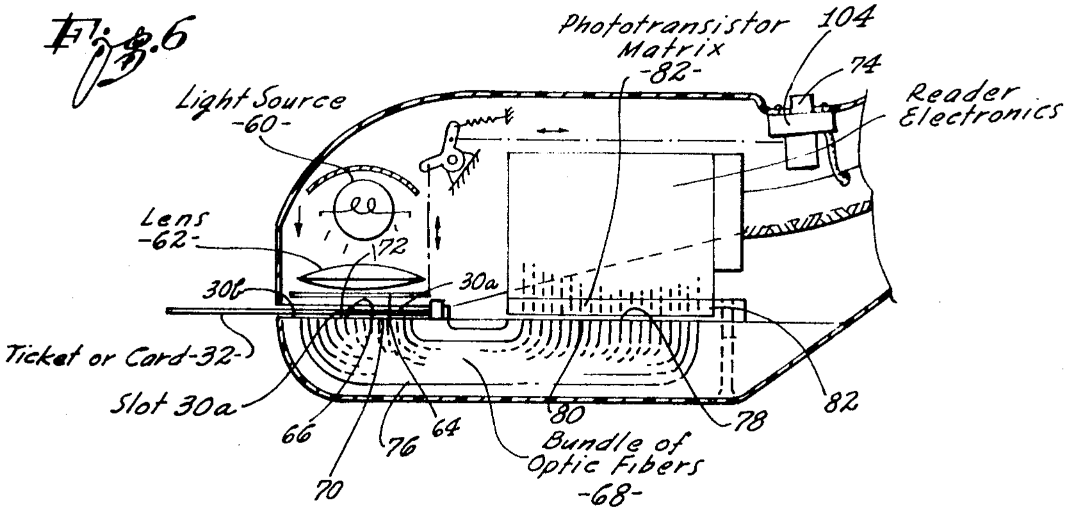
FIG. 6 is a section taken on the line 6—6 of FIG. 5.

Referring to FIG. 6, it may be seen that on one side of the slot **30*a* is disposed a light source 60, the light from which is collimated by a lens 62. The illumination from this lens may be passed through a flat translucent plate 64 to provide an even distribution of the illumination over its entire area against one side of which the Kimball ticket 32 may be disposed when the latter is inserted into the slot 30*a*. On the opposite side 30*b* of the slot there is provided a panel 66, preferably of an opaque plastic composition although not necessarily so, in which are embedded optical fibers 68, the ends 70 of which are brought out perpendicularly to the face 72 of the panel 66. One fiber 68 is provided for, and one end 70 thereof is thus brought out to the panel face 72, for each possible hole position in the Kimball or Dennison ticket. The plate 64 and the panel face 72 are spaced apart from each other a sufficient distance to permit the ticket 32 to be readily inserted into the slot 30. However, in order to prevent undesired light leakage, either the plate 64 or the panel 66 should be movable in the direction of the other member upon actuation of a trigger 74 in the handle. By such movement, the Kimball or Dennison ticket 32 may be tightly sandwiched between the panel face 72 and the face of the lens 64, thereby preventing leakage of light between adjacent holes in the ticket and adjacent fiber ends 70 in the panel 66**.

Each optical fiber 68 is brought through the plastic material 76 in which it is embedded, to another flat panel 78, where it is terminated in another end 80. All such other ends 80 are disposed in relation to each other in a pattern similar to that in the panel 66.

Disposed in registry with the fiber ends 80 is a matrix of phototransistors 82, each of which is excitable to produce a signal pulse upon the illumination of the fiber end 80 with which it is in registry. This phototransistor matrix 82 is contained in the handle 84 of the portable reading head 54, together with the threshold amplifier 86, the matrix scan driver 88, decoder 90 and counter 92, all of which are connected to the matrix 82 in the manner illustrated in the block diagram of FIG. 7*a*.

Figure 7B:
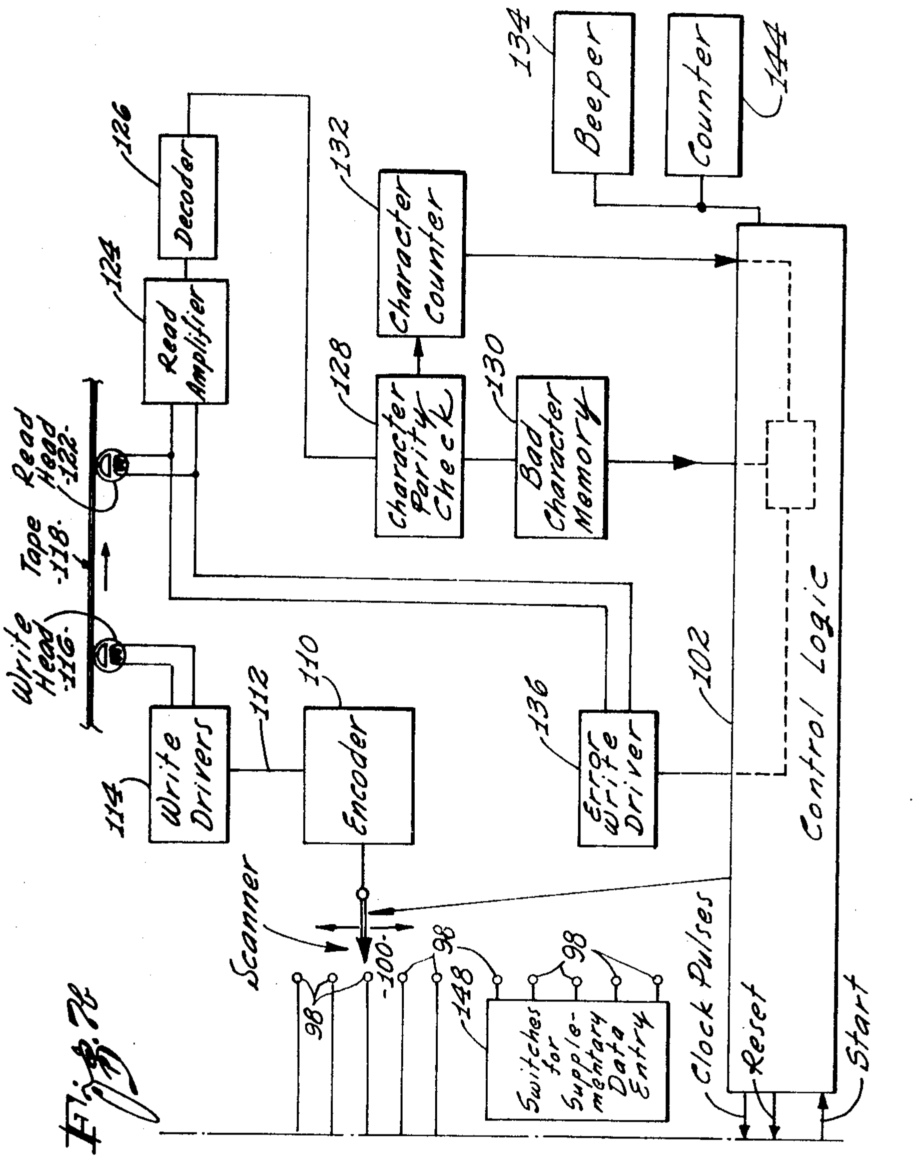
FIGS. 7*a* and 7*b* are block diagrams of the electronics employed in the portable reading head and associated tape recorder shown in FIG. 4.
Figure 7A:
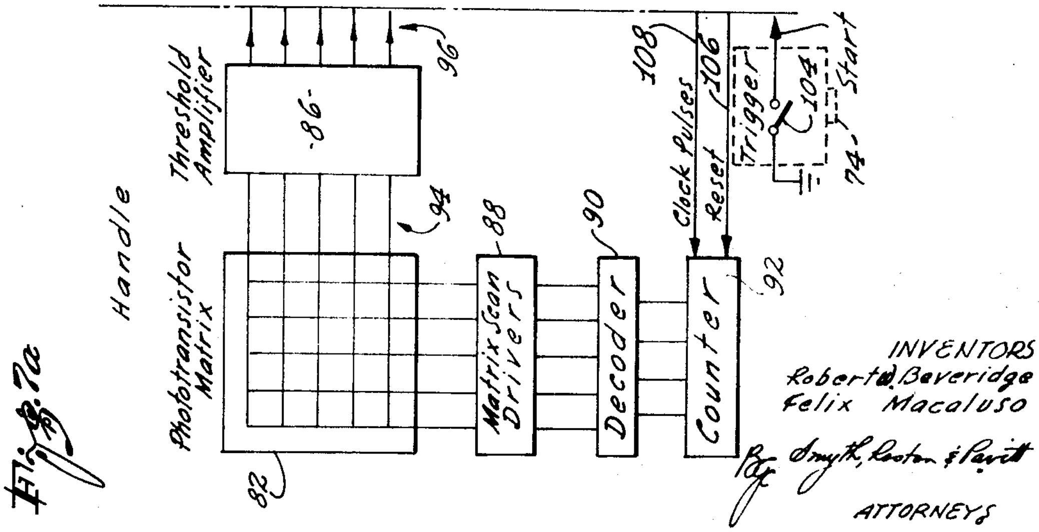

It will be appreciated by those skilled in the electronic art that the matrix 82 generates analog signals which are fed through the lines 94 to the amplifier 86. The latter converts such signals to digital signals at normal logic levels. These latter signals are delivered to the data lines 96, which end at the terminals 98, for scanning by the scanner 100 (FIG. 7*b*). The signals in the data lines 96 are parallel by bits but serial by character, using a 1, 2, 4, 7, P two-of-five code. In the decoding process, the unit must be able to determine which side of the ticket 32 has been inserted up and which down, so that the intelligence in the ticket holes may be properly interpreted.

The control logic 102, when triggered by the switch 104 in the handle 84, resets and initiates clock pulses through the lines 106, 108 respectively to actuate the counter 92, decoder 90 and matrix scan drivers 88.

Figure 4:
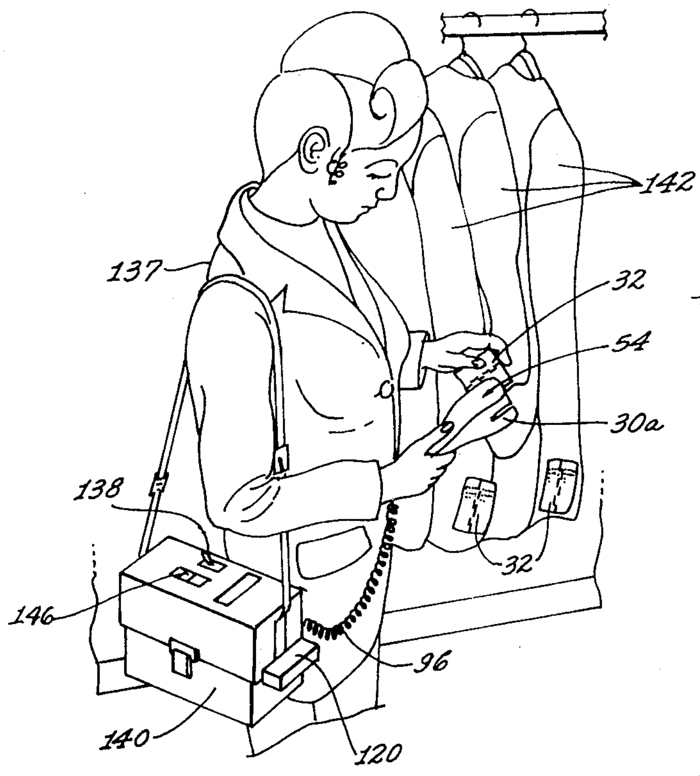
FIG. 4 is an illustration of the portable version of the optical Kimball or Dennison ticket reader of the present invention and showing the manner in which it may be employed.
Figure 5:
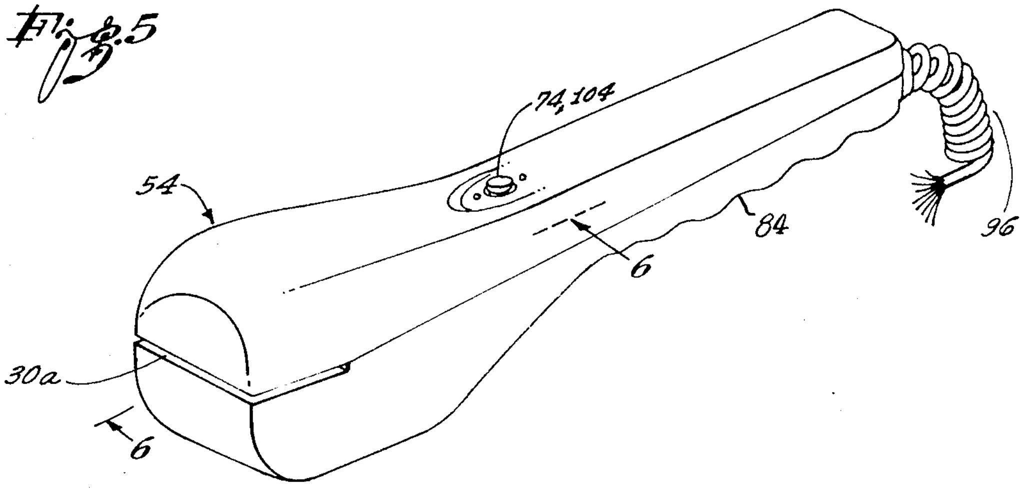
FIG. 5 is an enlarged perspective view partly broken away of the portable optical reading head seen in FIG. 4.

Digital data output picked up by the scanner 100 is fed to the encoder 110, the output of which is then employed through line 112 to excite the write drivers 114. The latter, in turn, cause the write head 116 to place the encoded information on the magnetic tape 118 of the cartridge 120 (See: FIG. 4).

In order that the intelligence so encoded and written on the magnetic tape 118 will be accurate, it is desirable to provide a simultaneous checking system. This may comprise a tape reading head 122 disposed a predetermined distance behind the write head 116 on the tape 118, a reading amplifier 124, and a decoder 126, the output of which is fed to a character parity checker 128. The latter is connected to a bad character memory device 130 and a character counter 132, both of which feed their respective outputs to the control logic 102.

Should the character parity checker 128, in collaboration with the character counter 132, note an unacceptable character reading, this unacceptable reading is immediately passed to the bad character memory device 130. The latter simultaneously blocks the signal of beeper 134 which ordinarily indicates completion of a valid reading, and also activates the error write driver 136. By blocking the beeper signal, the operator fails to hear the signal by which he or she is advised of an acceptable reading of the ticket 32. In the meantime, the error write driver 136 actuates the read head 122 to effect a flagging marking on the tape 118 that the preceding intelligence encoded on the tape from the bad ticket should be disregarded.

Provision is made for the entry manually of certain supplementary data, such as date, mark down price, store number, etc., to add to the information encoded in each individual ticket as it is read. Thus, the switches 148 may be provided to allow entry of supplementary data through, for example, six decimal digits.

The portable optical reader thus described and illustrated may be employed by an employee of a department store in the manner illustrated in FIG. 4. The operator 137 turns on the power switch 138 on the box 140 and then proceeds to move down the line of garments 142 and one at a time inserts each Kimball or Dennison ticket 32 properly in the slot 30a in the reading head 54. As soon as the ticket 32 is properly emplaced in the slot 30, the operator squeezes the trigger 74 and listens for the beep signal to indicate that the thus-inserted ticket has been properly read. This beep should occur almost instantly following the squeezing of the trigger since the actual optical and electronic reading process requires only a matter of milliseconds. Should no beep signal be heard by the operator, she should remove the ticket and examine it carefully to see if it is mutilated. If so, it should be set aside and a new ticket substituted. If the ticket does not appear to be mutilated, the operator may then re-insert it into the slot 30*a* and try for a re-reading.

The counter 144 provides a visual indication on the face 146 on top of the box 140 of the number of tickets which have been read and information concerning which has been placed on the magnetic tape 118 so that the operator will not continue taking readings beyond the capacity of the tape cartridge 120. When the latter has been fully utilized, it is removed from the box 140 and taken to the store's EDP center where the information on the tape 118 is transferred to the appropriate storage files for inventory or other uses.

Figure 3:
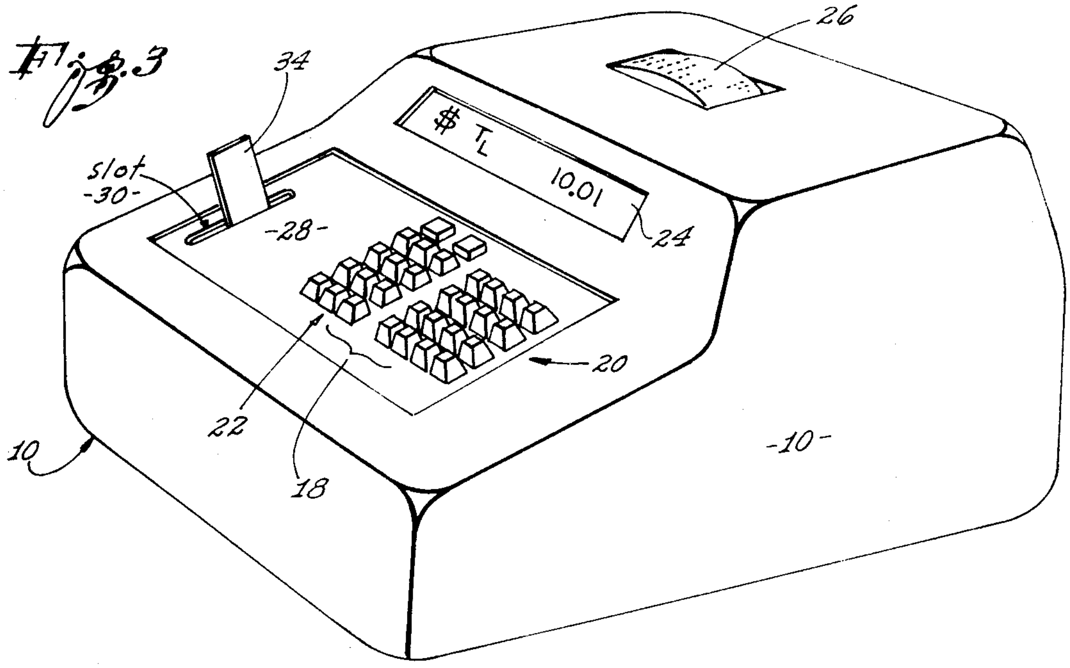
FIG. 3 is an enlarged perspective view of a terminal device constructed in accordance with the present invention.

The optical reader of the point-of-sale terminals 10, 10*a* of the embodiment of FIGS. 1–3 may be constructed in a manner identical to that of the portable reader 54 of the embodiments of FIGS. 4–7*b*, with these differences:

a. The actual reading may be either triggered automatically upon proper insertion of the Kimball ticket into the slot 30, or by pressing one of the instruction keys 22;

b. Intelligence contained on the ticket is not deposited upon any magnetic tape in the terminal, but is passed directly to the multiplexer 14, where it is fed into the entire computerized system in the EDP center;

c. If the terminal and system have a credit card handling capability, the slot 30 must also be adapted to receive and act with respect to the credit card. This includes locking the card in the slot 30, and releasing the card from the slot after the customer's credit is cleared by the EDP center. Such locking and unlocking may be accomplished by providing a special hole in the card into which a locking pin (not shown) may be inserted by a solenoid;

d. The terminal itself need not be provided with an error checking system since this function can be accomplished by the EDP center.

It should be readily appreciated that apparatus thus described and illustrated for reading optically such cardlike elements as Kimball and Dennison tickets and credit cards may be utilized greatly to speed up the processing of certain functions performed by personnel of retail stores. Thus, a sale of merchandise, whether on credit or for cash, may be "rung up" in little more time than it takes to insert the Kimball or Dennison ticket and credit card sequentially into the slot 30. The EDP center will respond in a matter of seconds and the sales slip is printed up by the printer 26 on the terminal 10. The credit of the purchaser is instantly checked and up-dated with the amount of the purchase and the credit card is released for return to the person presenting it to the sales clerk. Sales clerks will be found to have considerably more time to "sell" merchandise instead of having to act as scriveners and credit checkers.

All information concerning the item sold and the sale is immediately fed into the EDP center to up-date all store records relating to inventory of the particular item; dollar sales not only of the particular clerk and department, but of the entire store; cash on hand; credit extended to customers; etc.

In the case of the portable optical readers, complete inventory information as to each item may be accummulated in a matter of seconds on the tape 118 and this accumulation later fed into the store's EDP center. A store inventory may be taken either by the department clerks familiar with the merchandise, or by optical reader operators who may know little or nothing about the merchandise. All they need to know is where to find the merchandise tickets and what department or section they are inventorying.

By use of the apparatus of the present invention is conjunction with existing EDP equipment, therefore, the cost of retail (and particularly department) store operation may be considerably further reduced and its personnel better utilized to service customers and to engage in actual selling of the store's merchandise.

We claim:

1. Apparatus for reading optically and simultaneously preselected holes in a flat, relatively thin cardlike element, said element being of a predetermined peripheral configuration, and provided with a plurality of holes the size, number and pattern of disposition of which holes constitute in coded form information desired by the party having at least temporary custody of said element, said apparatus comprising:

A. a plurality of light conducting fibers, the number of said fibers corresponding to the total number of holes which could be provided in said element in any pattern of hole disposition, each said fiber having, i. a first end which terminates perpendicularly to, and flushly in, a flat first panel, all said first ends being disposed in a pattern such that when the element to be read is disposed on and in abutment with, and is properly indexed with respect to, said first panel, one fiber end is in axial registry with each possible hole which may be provided in said element, and ii. a second end which terminates in a second panel, all said second ends being disposed in a pattern having a predetermined relationship to the pattern of fiber ends of the first panel;

B. a source of light directed against said first panel and upon all of said first fiber ends, but spaced from said panel;

C. Means to receive said element and, upon proper indexing, to dispose it in a predetermined orientation and disposition between said first panel and said light source so that the hole pattern of said element is in registry with the pattern of fiber ends in said first panel;

D. Means to bring said first panel and said light source closely together to sandwich tightly therebetween said element when inserted in said receiving means, thereby to prevent leakage of light between adjacent fiber ends in the first panel and between adjacent holes in said element;

E. a plurality of phototransistors, the number of said phototransistors corresponding with the number of fiber ends in the second panel, each of said phototransistors being disposed closely in axial registry with a fiber end in said second panel and shielded from adjacent fiber ends, thereby to receive light emission only from the fiber end with which it is so in registry, and upon such receipt to generate an electric current impulse;

F. electronic means to decode the current impulses generated by the plurality of phototransistors in response to the pattern of light signals passed through the holes of each particular flat cardlike element inserted in said element receiving means, and to make such decoded information available for use in a computerized data processing system; and G. switching means, said switching means, upon being actuated, serving to actuate the means to bring said first panel and said light source closely together to sandwich the element therebetween, and to turn on the light source.

2. Apparatus for reading optically and simultaneously preselected holes in a flat, relatively thin cardlike element, said element being of a predetermined peripheral configuration and provided with a plurality of holes the size, number and pattern of disposition of which holes constitute in coded form information desired by the party having at least temporary custody of said element, said apparatus comprising:

A. a plurality of bundles of light conducting fibers, the number of said bundles of fibers corresponding to the total number of holes which could be provided in said element in any pattern of hole disposition, each said fiber bundle having, i. a first end which terminates perpendicularly to, and flushly in, a flat first panel, all said first ends being disposed in a pattern such that when the element to be read is disposed on and in abutment with, and is properly indexed with respect to, said first panel, one fiber end is in axial registry with each possible hole which may be provided in said element, and ii. a second end which terminates in a second panel, all said second ends being disposed in a pattern having a predetermined relationship to the pattern of fiber bundle ends of the first panel;

B. a source of light directed against said first panel and upon all of said first fiber bundle ends, but spaced from said panel;

C. means to receive said element and, upon proper indexing, to dispose it in a predetermined orientation and disposition between said first panel and said light source, so that the hole pattern of said element is in registry with the pattern of fiber bundle ends in said first panel;

D. Means to bring said first panel and said light source closely together to sandwich said element tightly therebetween, thereby to prevent leakage of light between adjacent bundles of fiber ends in the first panel and between adjacent holes in said element;

E. a plurality of phototransistors, the number of said phototransistors corresponding with the number of fiber bundle ends in the second panel, each of said phototransistors being disposed closely in axial registry with a fiber bundle end in said second panel and shielded from adjacent fiber bundle ends, thereby to receive light emission only from the fiber bundle end with which it is so in registry, and each of said phototransistors being adapted to convert light emission received from the fiber bundle end with which it is in registry to an electric current impulse;

F. electronic means to decode the current impulses generated by the plurality of phototransistors in response to the pattern of light signals passed through the holes of each particular flat cardlike element inserted in said element receiving means, and to make such decoded information available for use in a computerized data processing system; and G. switching means, said switching means, upon being actuated, serving to actuate the means to bring said first panel and said light source closely together to sandwich the element therebetween, and to turn on the light source.

3. The apparatus as claimed in claim 1, wherein the electronic means includes circuitry responsive to the particular current impulses generated by the phototransistors, and thereby to determine which side of the said element appears upwardly disposed when said element has been inserted in said receiving means and thereupon to accomplish proper decoding of the information contained on said element.

4. The apparatus as claimed in claim 2, wherein the fiber bundles embedded in the opaque material, the source of light, the means to receive the said element, and the plurality of phototransistors are disposed in a slotted portable container head of such size and configuration as to be held conveniently in one hand of an operator, the switching means is disposed operatively accessible to said hand of the operator, and the electronic means is incorporated in a separate portable package to be carried by the operator and is connected by wiring to the phototransistors.

5. The apparatus as claimed in claim 4 wherein electronic circuit means provide an audible signal upon proper completion of the reading of each element inserted in the apparatus.

6. The apparatus as claimed in claim 2, wherein the ends of the fiber bundles in the second panel are closely spaced together to enable the apparatus to be portably contained.

7. The apparatus as claimed in claim 1, wherein the electronic means includes amplifier means for the current impulses generated by the phototransistors, said amplifier means, however, being biased against amplifying current impulses of a predetermined minimum value, thereby to avoid undesired pickup of cross talk created by any light leakage between adjacent fiber bundle ends in either the first or second panels.

8. The apparatus as claimed in claim 1, wherein the electronic means includes circuitry which senses the presence in the receiving means of a mutilated element and upon so sensing such a mutilated element, rejects all information encoded in the holes thereof.

9. The apparatus as claimed in claim 6, wherein portable tape recording means are provided to receive the decoded information and thereby to make such information available for use in a computerized data processing system.

10. A system for improving the operation of department stores having a data processing facility, said system including:

A. a plurality of terminals disposed throughout the store, each of said terminals
   i. being disposed at a station convenient to a sales clerk of at least one of the store's merchandising departments;
   ii. including apparatus as described in claim 1; and
   iii. being connected to the store's data processing facility;

B. a first type of flat element insertable in the said element receiving means, said first type of flat element comprising a merchandising ticket, said ticket being attached to and removable from an item of store merchandise and having holes punched therein in a preselected pattern to encode information concerning the particular item of merchandise to which the ticket is attached; and C. a second type of flat element insertable in the said element receiving means, said second type of flat element comprising a credit card which is provided by the department store to each of selected customers, said credit card having holes punched therein to encode information relating to the holder of such credit card, whereby, when such customer purchases an item of merchandise from said store, the purchase transaction may be handled rapidly by the store's clerk by his first inserting one of said flat elements into the said receiving means of the apparatus for optical reading of the information encoded in the holes therein and communicating such information to the store's data processing facility, and then, by inserting said second flat element into the said receiving means of the apparatus also for optical reading of the information which is encoded in the holes of said other element, and communicating the same to the store's data processing facility.

* * * * *